US009030850B2

(12) United States Patent
Chen

(10) Patent No.: US 9,030,850 B2
(45) Date of Patent: May 12, 2015

(54) RESONANT SWITCHING REGULATOR WITH ADAPTIVE DEAD TIME

(71) Applicant: Fuji Electric Co., Ltd., Kawasaki (JP)

(72) Inventor: Jian Chen, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 14/448,092

(22) Filed: Jul. 31, 2014

(65) Prior Publication Data

US 2015/0009717 A1    Jan. 8, 2015

Related U.S. Application Data

(63) Continuation-in-part of application No. 13/711,797, filed on Dec. 12, 2012, now abandoned, and a continuation-in-part of application No. 13/523,348, filed on Jun. 14, 2012, now Pat. No. 8,897,036.

(30) Foreign Application Priority Data

Jul. 7, 2011    (JP) .................................. 2011-150974
Jan. 26, 2012    (JP) .................................. 2012-013710

(51) Int. Cl.
*H02M 3/335* (2006.01)
*H02M 3/337* (2006.01)
*H02M 1/38* (2007.01)

(52) U.S. Cl.
CPC ........ *H02M 3/33507* (2013.01); *Y02B 70/1433* (2013.01); *H02M 1/38* (2013.01); *H02M 3/3376* (2013.01)

(58) Field of Classification Search
CPC ... H02M 3/28; H02M 3/335; H02M 3/33507; H02M 3/337; H02M 3/3376; H02M 1/38; H02M 2001/0058; H02M 2007/4815
USPC ......... 363/16, 21–21.04, 21.08, 21.12, 21.16, 363/78, 95, 971, 97
See application file for complete search history.

(56) References Cited

U.S. PATENT DOCUMENTS

| 5,805,432 | A | 9/1998 | Zaitsu et al. |
| 6,018,467 | A | 1/2000 | Majid et al. |
| 7,019,986 | B2 | 3/2006 | Yokoyama et al. |
| 8,391,026 | B2 | 3/2013 | Santoro et al. |
| 8,416,582 | B2 | 4/2013 | Usui |
| 2005/0078490 | A1 | 4/2005 | Yokoyama et al. |
| 2005/0184714 | A1 | 8/2005 | Rusu et al. |
| 2006/0291117 | A1 | 12/2006 | Kyono |
| 2007/0076448 | A1 | 4/2007 | Usui |
| 2009/0284991 | A1 | 11/2009 | Nishikawa |

(Continued)

FOREIGN PATENT DOCUMENTS

JP    09-093922 A    4/1997
JP    2005-051918 A    2/2005

(Continued)

*Primary Examiner* — Timothy J Dole
*Assistant Examiner* — Ivan Laboy Andino
(74) *Attorney, Agent, or Firm* — Rossi, Kimms & McDowell LLP

(57) ABSTRACT

A switching power supply of certain aspects of the invention includes a minimum dead time generating circuit that generates a minimum dead time from an OFF timing of an ON pulse detected from the voltage across an auxiliary winding of the transformer by a differentiating circuit. An ON width-determining means of a voltage control oscillator is started, after this minimum dead time, into operation to determine the ON width of the semiconductor switch.

2 Claims, 9 Drawing Sheets

(56) References Cited

U.S. PATENT DOCUMENTS

2010/0026381 A1 2/2010 Huang
2011/0007529 A1 1/2011 Usui
2013/0242620 A1 9/2013 Hosotani

FOREIGN PATENT DOCUMENTS

| | | |
|---|---|---|
| JP | 2007-006614 A | 1/2007 |
| JP | 2007-527190 A | 9/2007 |
| JP | 2009-027803 A | 2/2009 |
| JP | 2010-004596 A | 1/2010 |
| JP | 2011-150974 A | 8/2011 |

RESONANT SWITCHING REGULATOR WITH ADAPTIVE DEAD TIME

CROSS-REFERENCE TO RELATED APPLICATIONS

This application is a continuation-in-part of application Ser. No. 13/711,797, filed 12 Dec. 2012, which claims priority to Japanese Patent Application No. 2012-013710, filed on Jan. 26, 2012. This application is also a continuation-in-part of application Ser. No. 13/523,348, filed 14 Jun. 2012, which claims priority to, Japanese Patent Application No. 2011-150974, filed on Jul. 7, 2011. The disclosure of the above-referenced applications, in their entirety, including the drawings, claims, and the specifications thereof, are incorporated herein by reference herein.

BACKGROUND OF THE INVENTION

1. Field of the Invention

Embodiments of the invention relate to switching power supplies of a current resonance type, and in particular to switching frequency stabilization of switching power supplies.

2. Description of the Related Art

FIG. 4 shows a circuit diagram of a conventional resonance type switching power supply. The switching power supply comprises a transformer T having a primary winding WP1 and secondary windings WS1 and WS2 with a center tap therebetween in the main circuit of the switching power supply. The switching power supply comprises, in the primary side thereof, a capacitor Ci that is a power supply having a positive terminal Pi and a negative terminal Ni, a series circuit of semiconductor switches of MOSFETs Qa and Qb connected in parallel to the capacitor Ci, and a series circuit of the primary winding WP1 and a resonant capacitor Cr connected in parallel to the MOSFET Qb. The switching power supply comprises, in the secondary side thereof, rectifying diodes D1 and D2 connected to the secondary windings WS1 and WS2, respectively, and a DC output capacitor Co that is supplied with a full-wave rectified voltage and has terminals connecting to DC output terminals Po and No. The resistor Ro connected in parallel with the capacitor Co is a dummy resistor for stabilizing the output voltage in a no load period.

The circuit for controlling the switching power supply comprises: an error amplifier GA that senses a DC output voltage Vo and amplifies the error from a reference voltage, a voltage controlling oscillator VCO that receives the output from the GA, a control circuit CNT2 connected to the output of the voltage control oscillator VCO, and a driving circuit GD that converts the output from the control circuit CNT2 to the driving signal for the MOSFETs Qa and Qb. The MOSFETs Qa and Qb of this switching power supply repeat turning ON and OFF alternately in a duty factor near 50% with a certain dead time in which the both MOSFETs are in an OFF state. Thus, current resonance operation is performed with a leakage inductance between the primary winding WP1 and the secondary windings WS1 and WS2 of the transformer T and the resonance capacitor Cr to transfer electric power from the primary side to the secondary side.

The output from the secondary winding of the transformer T is rectified by the diodes D1 and D2, and smoothed by the smoothing capacitor Co to become a DC output voltage with a small ripple. The output voltage is sensed by the error amplifier circuit GA; the voltage controlling oscillator circuit VCO controls the oscillation frequency based on the output voltage; and the control circuit CNT2 and the driving circuit GD generate the signals for ON-OFF controlling the two MOSFETs Qa and Qb alternately. Thus, stable output voltage is obtained. The switches Qa and Qb in the switching power supply repeat ON and OFF operation alternately in a duty factor near 50% with a certain dead time in which both switches are in an OFF state. Thus, a current resonant operation is performed with a leakage inductance between the primary winding WP1 and the secondary windings WS1 and WS2 of the transformer T and the resonance capacitor Cr to transfer electric power from the primary side to the secondary side.

One of the advantages of the current resonance type switching power supply is implementation of soft switching using body diodes (not shown) of the MOSFETs Qa and Qb. From the state in which the high side MOSFET Qa is in an OFF state and the low side MOSFET Qb is in an ON state carrying the current IQb in the direction indicated by the arrow in FIG. 4, when the low side MOSFET Qb turns OFF, the current IQb is commutated to the body diode Da of the high side MOSFET Qa. When an electric current is flowing through the body diode Da, the voltage Vs at the connection point between the MOSFETs Qa and Qb is nearly equal to the voltage Vi of the capacitor Ci, which is a DC power supply. As a consequence, turning ON of the MOSFET Qa in this period does not change rapidly the voltage across the MOSFET Qa. Thus, zero voltage switching (ZVS) is performed.

Similarly, when the high side MOSFET Qa is turned OFF and the current IQa that has been flowing in the MOSFET Qa is commutated to the body diode Db of the low side MOSFET Qb, and the voltage Vs at the connection point of the MOSFETs Qa and Qb becomes nearly equal to the ground potential. As a consequence, turning ON of the MOSFET Qb, in this period of current-carrying state of the body diode Db, does not change rapidly the voltage across the MOSFET Qb. Thus, zero voltage switching (ZVS) is performed in this case, too.

However, when the voltage Vs at the connection point between the MOSFETs Qa and Qb is at a certain voltage between the voltage Vi of the capacitor Ci as a DC voltage source and the ground potential, if the MOSFET Qa or MOSFET Qb is turned ON, hard switching occurs. In this case, the current through the MOSFET Qa or MOSFET Qb as well as the voltage across the MOSFET Qa or MOSFET Qb changes rapidly. This generates noise and cause power loss in the MOSFET Qa or MOSFET Qb. In addition, in the time duration the body diode Da of the MOSFET Qa is carrying an electric current, if the MOSFET Qb turns ON, through-current flows during the reverse recovery time from the DC power source Ci through the body diode Da to the MOSFET Qb. This through-current can grow instantaneously to a large current and may break down the MOSFETs Qa and Qb.

Some measures have been proposed to cope with the problems of hard switching and the through-current. Japanese Unexamined Patent Application Publication No. 2005-051918 (also referred to herein as "Patent Document 1"), for example, discloses a switching power supply in which a state of current flow through the body diode is detected by sensing the current flowing in a resonant circuit and in this state, generation of a driving signal to turn ON or OFF of the two switches is inhibited. Japanese Unexamined Patent Application Publication No. 2007-527190 (also referred to herein as "Patent Document 2") discloses a circuit and method that copes with both problems of hard switching and through-current by directly sensing the voltage at the connection point between the two switches.

However, the structure of Patent Document 1 necessarily includes a resistor for current sensing in the resonance circuit:

which causes a power loss. The structure of Patent Document 2 needs to sense a high voltage at the connection point between the two MOSFETs, which requires a control circuit that has a high voltage element, so the structure needs a large scale control circuit.

To cope with the problems, the inventor of the present invention has proposed a circuit disclosed in Japanese Patent Application No. 2011-150974 (also referred to herein as "Patent Document 3"); the circuit generating a dead time based on voltage variation sensed by an auxiliary winding provided in the transformer. FIG. 5 shows the circuit construction of the switching power supply disclosed in Patent Document 3; FIG. 6 shows the circuit construction of the voltage control oscillator VCO2 in the circuit of FIG. 5;, and FIG. 7 shows operation waveforms in the circuit of FIG. 5. The main circuit structure is similar to that of FIG. 4 except for the auxiliary winding WP2 added to the transformer T1. As shown in the circuit construction of FIG. 5, the auxiliary winding WP2 connects to a dv/dt detecting circuit DVD, the outputs P2_H and P2_L of the dv/dt detecting circuit DVD are delivered to a dead time adding circuit DT, and the output On_trig of the dead time adding circuit DT is delivered to a control circuit CNT3 and a voltage control oscillator VCO2.

FIG. 6 shows a circuit construction of the voltage control oscillator VCO2. Dead time widths, the Td1 and Td2 in FIG. 7, are determined by the circuit comprising a capacitor C2, a current source I2, a switch S2, a comparator CP2, and a reference voltage REF2. The width of the dead time is determined by the period from opening of the switch S2 at the turning OFF timing of the ON pulse until the voltage of the capacitor C2 reaches the reference voltage REF2.

The ON pulse width is determined by the integration circuit comprising a capacitor C1, a current source I1, and a switch S1. The capacitor C1 start to be charged when the dead time is passed after an On_trig is given. The ON pulse turns OFF when the voltage VC1 reaches the feedback voltage Vfb, which is the output of the error amplifier GA.

A switching frequency Fsw in the conventional current resonance type switching power supply of FIG. 4 is determined by an ON width Ton and a dead time Td determined in the voltage control oscillator VCO and given by the Formula (1) below.

$$Fsw=1/(2*(Ton+Td)) \quad (1)$$

Here, the ON width Ton is determined by the feedback voltage Vfb and the dead time Td is determined by the control circuit to be a fixed value.

A dead time Td in the conventional current resonance type switching power supply having a dead time automatic adjusting function shown in FIG. 5 is determined by a dead time automatic adjusting circuit.

Constant output voltage control uses voltage mode frequency control to perform stable operation. The ON width Ton is determined by the feedback voltage Vfb and given by the Formula (2) below.

$$Ton=fon(Vfb) \quad (2)$$

The function fon(Vfb) is a linear or non-linear function. Therefore, the switching frequency Fsw is given by the Formula (3) below.

$$Fsw=1/(2*(fon(Vfb)+Tdadj)) \quad (3)$$

As is apparent from the Formula (3), the switching frequency Fsw is a function of the feedback voltage Vfb and the dead time Tdadj.

As shown in FIG. 7, the voltage control oscillator VCO charges the capacitor of the integrating circuit after the end of the dead time. So, variation of the dead time causes variation in the switching frequency and oscillation of resonant current. Although the feedback voltage Vfb increases linearly in the beginning of the soft starting, due to lack of feedback control, variation of the dead time Tdadj may cause oscillation and generate acoustic noise. The variation in the Tdadj needs to be absorbed in the feedback control system in normal operation, so parameter setting for phase compensation is difficult resulting in occurrence of oscillation. Thus, there is a need for an improved switching power supply in the art.

SUMMARY OF THE INVENTION

Embodiments of the invention address this and other needs. Embodiments of the invention provide a switching power supply of a resonance type in which the switching frequency does not change even though the dead time varies.

A switching power supply according to a first aspect of the present invention comprises: a transformer having a primary winding, a secondary winding, and a auxiliary winding, the auxiliary winding being disposed in a primary side of the transformer and detecting variation in a voltage across the primary winding; a series-connected circuit including a first semiconductor switch and a second semiconductor switch, the series connected circuit being connected in parallel to a DC power source; a series-connected resonance circuit including series-connected components of a resonance capacitor, an inductance element of at least one of a resonance reactor or a leakage inductance of the transformer, and the primary winding of the transformer; a differentiating circuit for detecting a timing of an inversion beginning timing or an inversion ending timing of the voltage detected by the auxiliary winding after receiving a first trigger signal for turning OFF of the first semiconductor switch or the second semiconductor switch; a dead time adjusting circuit for generating a second trigger signal at a timing of turn ON the first semiconductor switch or the second semiconductor switch delaying a predetermined time period from the timing detected by the differentiating circuit; and a voltage control oscillator including an ON width setting means that comprises a minimum dead time-generating circuit for generating a minimum dead time on receiving the first trigger signal and start up, after the minimum dead time, operation to determine an ON width of the first semiconductor switch or the second semiconductor switch.

A switching power supply according to a second aspect of the present invention is the switching power supply according to the first aspect of the invention, wherein the ON width determining means comprises: a minimum dead time-generating circuit for generating the minimum dead time on receiving the first trigger signal, an integration circuit to start integrating operation according to an output signal of the minimum dead time generating circuit, and a voltage comparing circuit for comparing the output of the integrating circuit with an output of an offset amplifier that senses a DC output voltage and nullify a difference from a reference value, and wherein the ON width is determined to be the time duration from the end of the dead time to be the next first trigger signal in the case the second trigger signal is generated within the minimum dead time, and the ON width is determined to be the time duration from the moment the second trigger is generated to the next first trigger signal in the case the second trigger signal is generated after the end of the minimum dead time.

The switching power supply in accordance with certain embodiments of the invention comprises: a differentiating circuit that differentiates a detected voltage across an auxiliary winding of the transformer after receiving a first trigger signal for turning OFF of a semiconductor switch and detects an inversion beginning timing or an inversion ending timing of the detected voltage; and a dead time adjusting circuit that generates a second trigger signal for a timing to turn ON the semiconductor switch delaying a predetermined time after the timing detected by the differentiating circuit. The switching power supply comprises a voltage controlling oscillator including an ON width determining means that comprises a minimum dead time generating circuit for generating a minimum dead time on receiving the first trigger signal and starts up operation to determine an ON width of the semiconductor switch after the minimum dead time. As a result, the switching frequency is stable even if the dead time is changed, and oscillation of the resonant frequency and unstable resonance are eliminated. Therefore, a relatively stable switching power supply can be provided.

DETAILED DESCRIPTION

Figure 1:
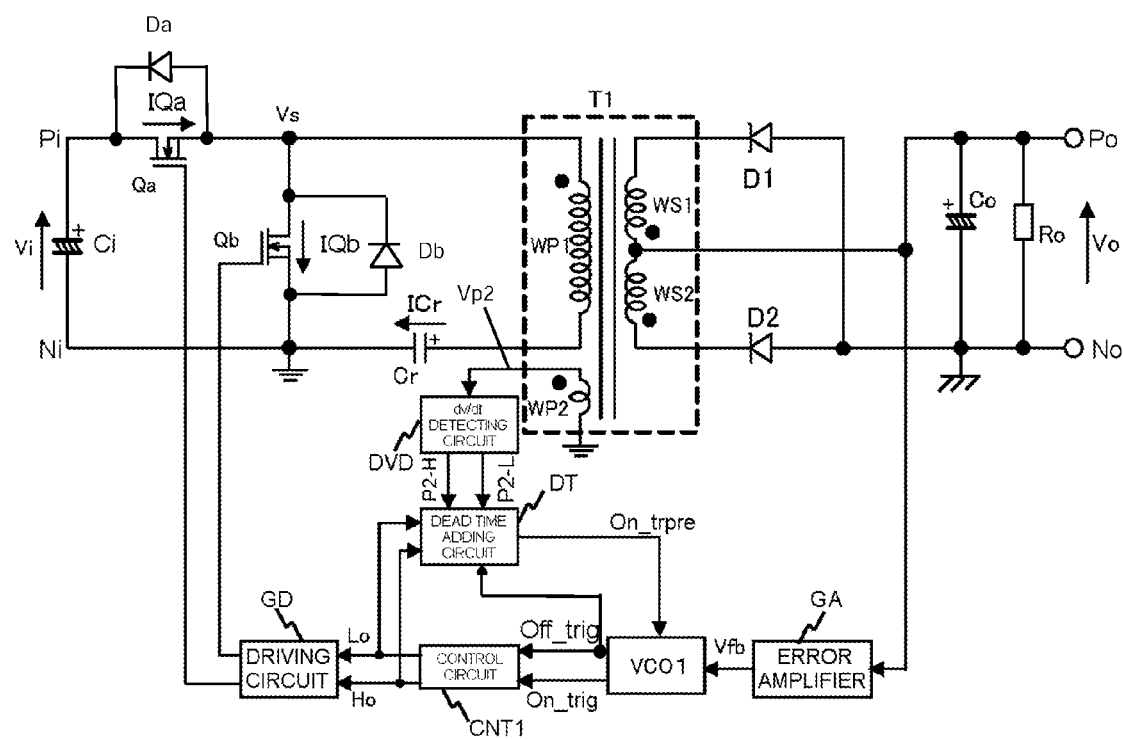
FIG. 1 is a circuit diagram of a switching power supply of a first embodiment of the invention.
Figure 2:
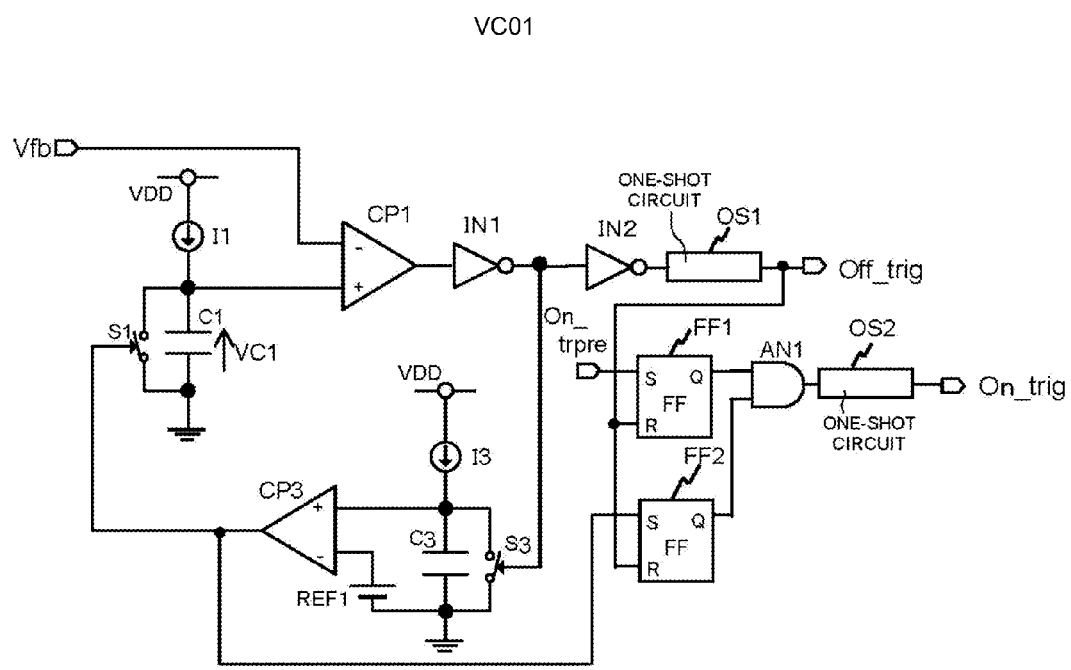
FIG. 2 is an example of a circuit diagram of the voltage control oscillator indicated in FIG. 1.
Figure 3:
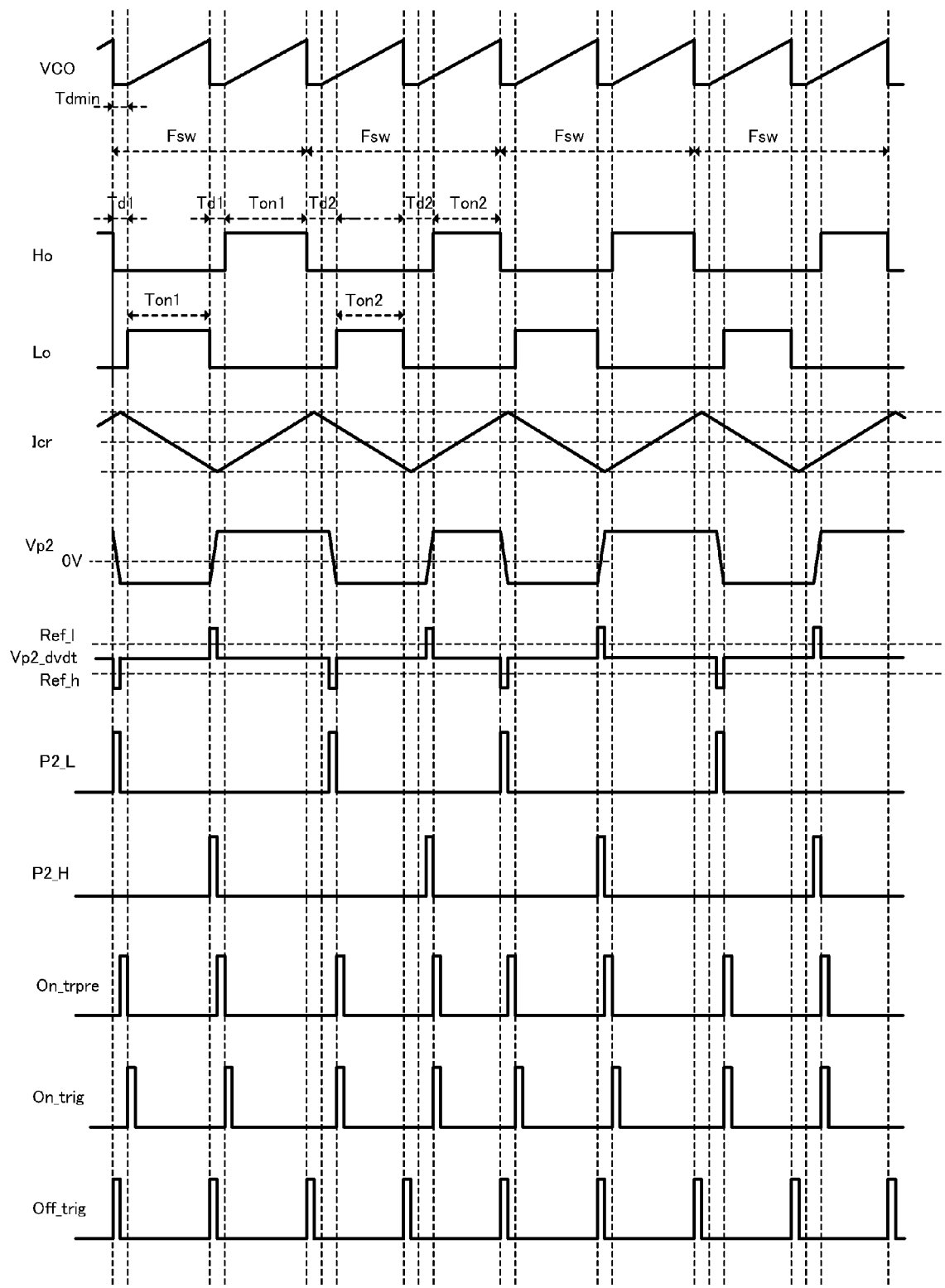
FIG. 3 shows operational waveforms in the switching power supply of the first embodiment.
Figure 4:
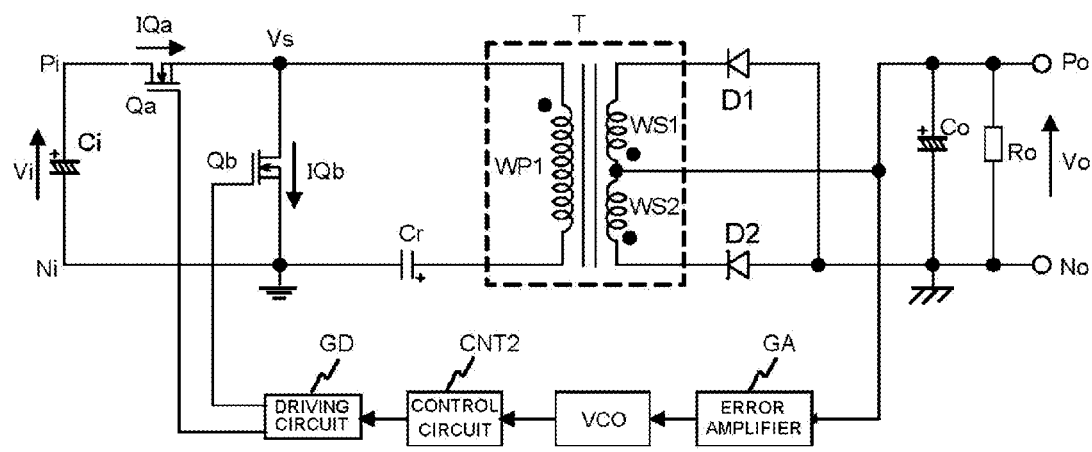
FIG. 4 is a circuit diagram of a first conventional example of switching power supply.
Figure 5:
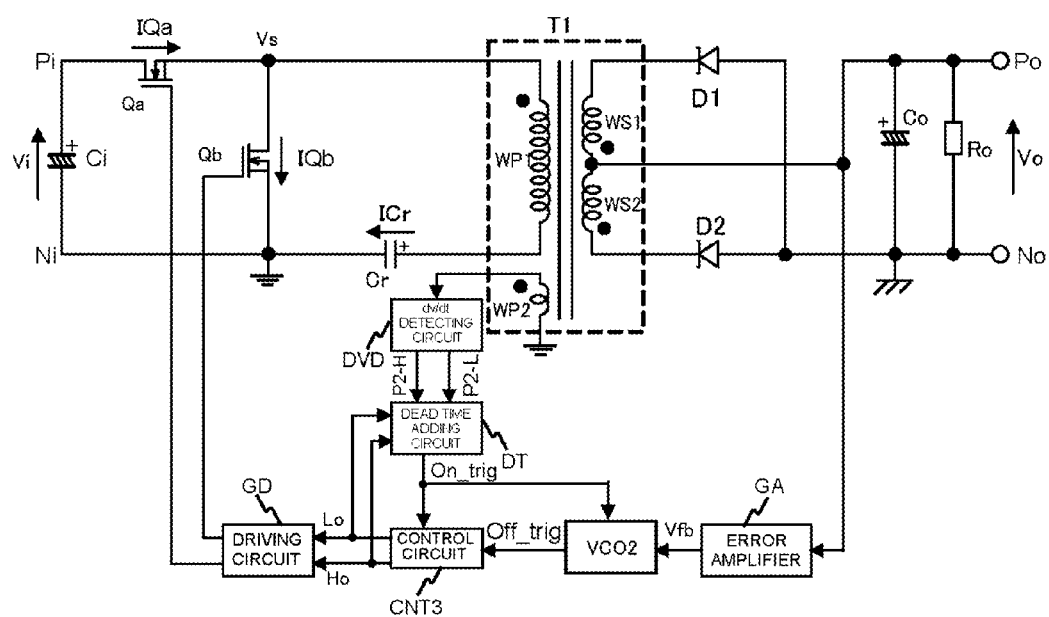
FIG. 5 is a circuit diagram of a second conventional example of a switching power supply.
Figure 6:
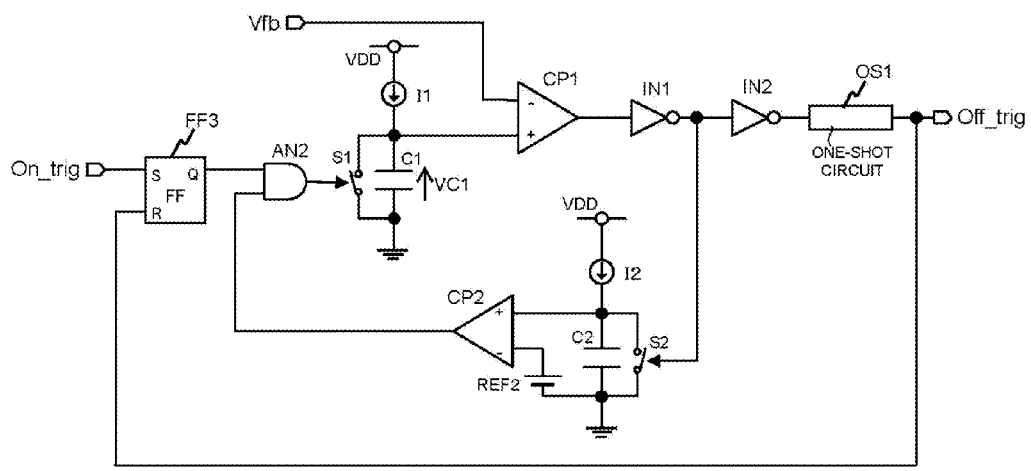
FIG. 6 is a circuit diagram of a voltage control oscillator of the second conventional example of a switching power supply.
Figure 7:
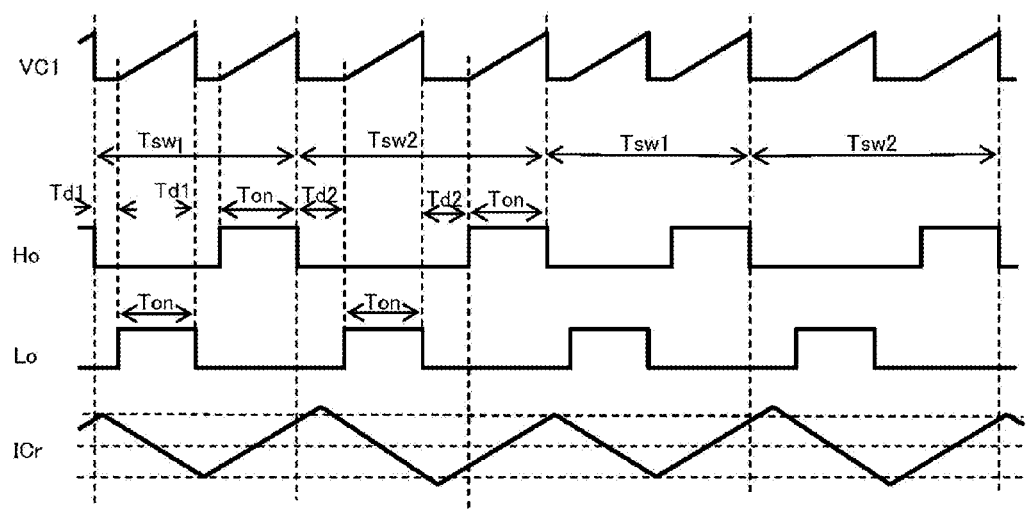
FIG. 7 shows operational waveforms in the second conventional example of a switching power supply.

A switching power supply: in accordance with certain embodiments of the invention can include: a differentiating circuit that differentiates a detected voltage across an auxiliary winding of the transformer after receiving a first trigger signal for turning OFF of a semiconductor switch and detects an inversion beginning timing or an inversion ending timing of the detected voltage; and a dead time adjusting circuit that generates a second trigger signal for a timing to turn ON the semiconductor switch delaying a predetermined time after the timing detected by the differentiating circuit. The switching power supply comprises a voltage controlling oscillator including an ON width determining means that comprises a minimum dead time generating circuit for generating a minimum dead time on receiving the first trigger signal and starts up operation to determine an ON width of the semiconductor switch after the minimum dead time.
[Embodiment]
FIG. 1 shows a circuit diagram of a switching power supply of an embodiment of the invention. The switching power supply of the embodiment of FIG. 1 is different from the second conventional example of FIG. 5 in that while the output signal On_trig from the dead time adding circuit (or the dead time adjusting circuit) is delivered to the control circuit CNT3 and the voltage control oscillator VCO2 in the conventional switching power supply, an On_trpre signal from the dead time adding (adjusting) circuit DT is delivered to a voltage control oscillator VCO1, from which an Off_trig signal (also referred to herein as a first trigger signal) and an On_trig signal (also referred to herein as a second trigger signal) are given to the control circuit CNT1 in the invented switching power supply. FIG. 2 shows a detailed circuit diagram of the voltage control oscillator VCO1 of the embodiment; and FIG. 3 shows operation waveforms in the switching power supply of the embodiment.

In the detailed circuit diagram of the voltage control oscillator VCO1 shown in FIG. 2, the circuit for determining and generating the minimum dead time Tdmin comprises a capacitor C3, a current source I3, a switch S3, a comparator CP3, and a reference voltage REF1. The switch S3 is opened at the time of transition of the switching signal from an ON signal to an OFF signal to charge the capacitor C3 with the current source I3. When the voltage across the capacitor 3 reaches the reference voltage REF1, the output of the comparator CP3 turns to H (high), which opens the switch S1.

The integration circuit for determining the ON pulse width comprises a capacitor C1, a current source I1, and a switch S1. The capacitor C1 begins to be charged with the current source I1 after the minimum dead time Tdmin. A comparator CP1 compares the voltage VC1 across the capacitor C1 and the feedback voltage Vfb, which is the output of the error amplifier GA. At a time, a first trigger time, at which the voltage VC1 reaches the feedback voltage Vfb, the ON pulse turns OFF. Since the minimum dead time Tdmin can be selected at a sufficiently small value as compared with a switching time width, change of the dead time does not affect the time duration Tsw of one period, and the switching frequency does not vary as well.

A flip-flop FF1 is set by the On_trpre signal and reset by the Off_trig signal: a flip-flop-FF2 is set by the minimum dead time Tdmin and reset by the Off_trig signal. The Q output of the FF1 and the Q output of the FF2 are given to the AND gate AN1, which generates a logical product of the two Q outputs and delivers it to a one-shot circuit OS2, to obtain an On_trig.

FIG. 3 shows operational waveforms in the switching power supply of the embodiment according to the present invention. These are waveforms in the case of dead time Td1 or Td2 larger than the Tdmin. In FIG. 3, the symbol VC1 shows the waveform of the voltage of the capacitor C1; Ho, the ON/OFF signal of the high side MOSFET Qa; Lo, the ON/OFF signal of the low side MOSFET Qb; and ICr, the current through the resonance capacitor Cr. Time duration of one period Tsw is 2*(Td1+Ton1) when a dead time is Td1 and an ON pulse width is Ton1; and time duration of one period Tsw is 2*(Td2+Ton2) when a dead time is Td2 and an ON pulse width is Ton2. When the dead time increases, the ON pulse width is shortened to keep the time duration of one period unchanged. Thus the switching frequency is kept constant. The Ton1 and Ton2 are the time duration from the end of the dead time to the next first trigger signal. If the dead time Td1 or Td2 is smaller than the Tdmin, the dead time Td1 (or Td2) is equalized to the Tdmin to obtain stable operation. In this case, the time duration of one period Tsw is equal to 2*(Tdmin+Ton), where Ton is a time duration from the end of the minimum dead time to the next first trigger signal.

In the operation described above, the switching time width Tsw (or the time duration of one period) is kept at a constant value even if the dead time Td is changed, and thus, the switching frequency is constant as well.

Figure 8:
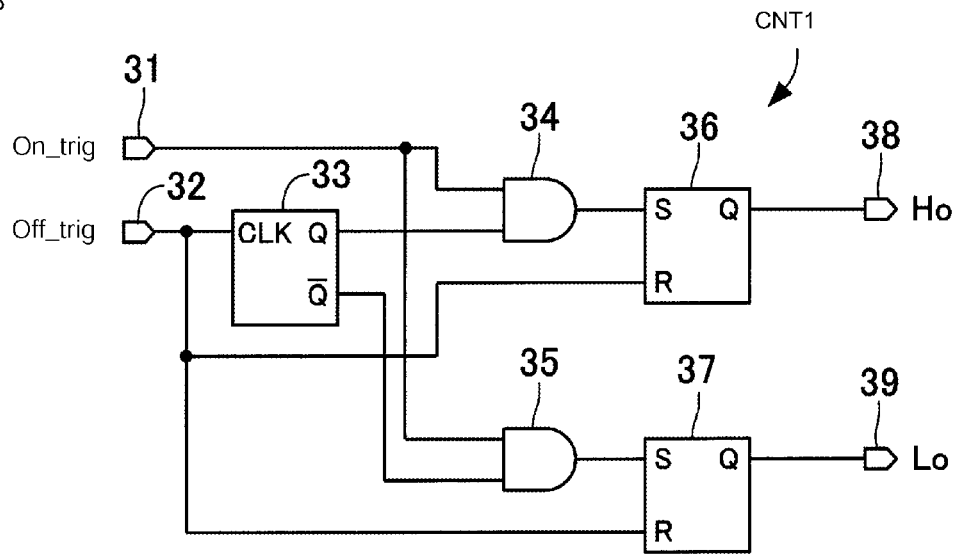
FIG. 8 is a circuit diagram showing a construction example of a controller circuit in an embodiment according to the invention.
Figure 9:
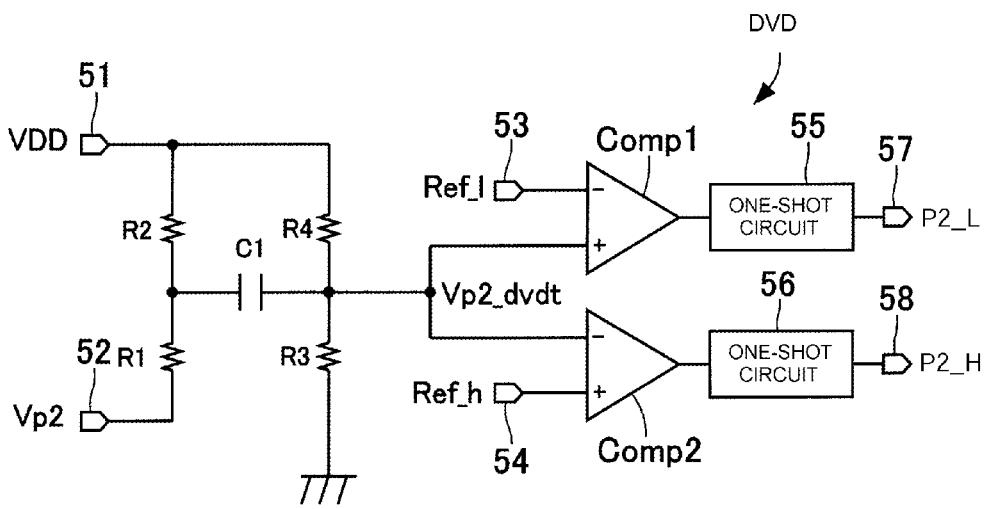
FIG. 9 is a circuit diagram showing a construction example of a differentiation detecting circuit in an embodiment according to the invention.
Figure 10:
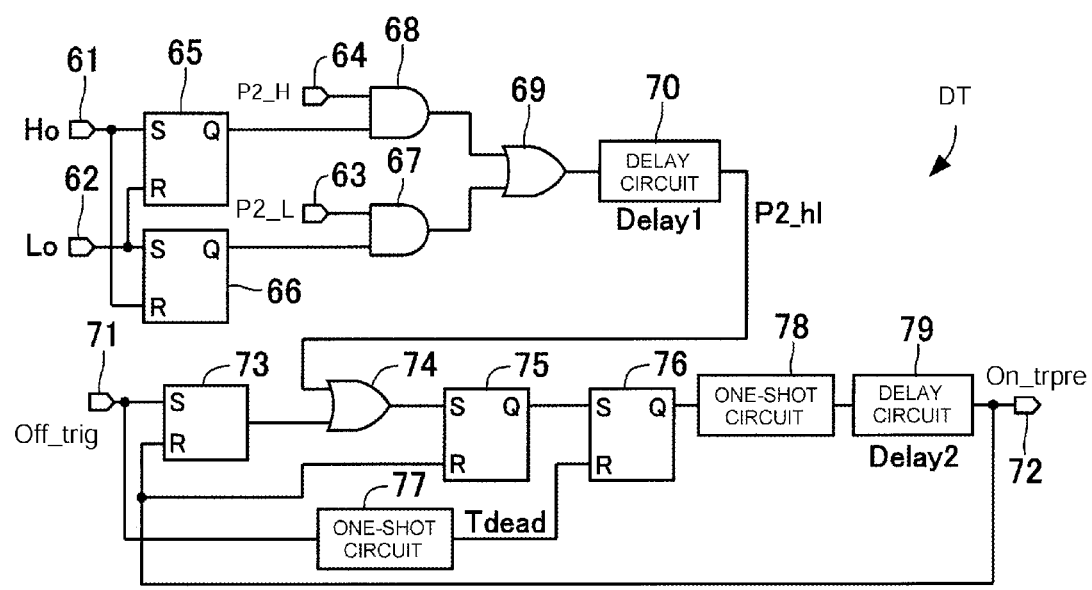
FIG. 10 is a circuit diagram showing a construction example of a dead time adjusting circuit in an embodiment according to the invention.

FIG. 8 is a circuit diagram showing a construction example of the controller circuit 3; FIG. 9 is a circuit diagram showing a construction example of the differentiation detecting circuit 5; and FIG. 10 is a circuit diagram showing a construction example of the dead time adjusting circuit 6.

The controller circuit CNT1 as shown in FIG. 8 comprises: two input terminals 31 and 32; T flip-flop 33; two AND gates 34 and 35; two reset priority RS flip-flops 36 and 37; and two output terminals 38 and 39. The T flip-flop 33 has a terminal connected to the input terminal 32 that receives the signal Off_trig, an output terminal Q that is connected to one input terminal of the AND gate 34, and an inverted output terminal that is connected to one input terminal of the AND gate 35. The other terminal of the AND gate 34 and the other terminal of the AND gate 35 are both connected to the input terminal 31 that receives the signal On_trig. The output terminal of the AND gate 34 is connected to the set input terminal of the RS flip-flop 36 and the output terminal of the AND gate 35 is connected to the set input terminal of the RS flip-flop 37. The reset input terminal of the RS flip-flop 36 and the reset input terminal of the RS flip-flop 37 are both connected to the input terminal 32. The output terminal Q of the flip-flop 36 is connected to the output terminal 38 delivering a signal Ho, and the output terminal Q of the flip-flop 37 is connected to the output terminal 39 delivering a signal Lo.

The controller circuit CNT1 receives the signal Off_trig from the voltage controlling oscillator circuit (VCO) 2 and the signal On_trig from the dead time adjusting circuit DT, and generates the signals Ho and Lo and delivers them to the driver circuit 4. The driver circuit 4 has output terminals that are connected to the gate terminal of the switch Qa and the gate terminal of the switch Qb. The driver circuit 4 generates a signal for driving the switch Qa from the received signal Ho and a signal for driving the switch Qb from the received signal Lo, to drive switching operation of the switches Qa and Qb.

The differentiation detecting circuit DVD as shown in FIG. 9 has a Vdd terminal 51 that receives power supply, an input terminal 52 that is connected to the auxiliary winding P2 of the transformer T1, and a differentiation circuit including resistances R1 through R4 and a capacitor C1. The capacitor C1 and the resistances R3 and R4 provide a function to differentiate the signal Vp2 delivered to the input terminal 52. The resistances R1 and R2 provide a function to level-shift the signal Vp2, which can be a negative voltage, to a positive value at all times. The input terminal 52 is connected to the Vdd terminal through the series-connected resistances R2 and R1 that have the same resistance value. The connection point of the resistances R1 and R2 is connected to one terminal of the capacitor C1. Thus, the signal Vp2 that varies on both sides of the ground potential is level-shifted to a signal varying around the potential of VDD/2 and delivered to the one terminal of the capacitor C1. This construction allows operating a controller circuit of a semiconductor integrated circuit that does not have a negative power supply and does not deal with a negative voltage signal. The Vdd terminal 51 is also connected to the ground through the series-connected resistances R3 and R4 that have the same resistance value. The connection point of the resistances R3 and R4 is connected to the other terminal of the capacitor C1. The resistances R3 and R4 together with the capacitor C1 form a differentiating circuit and the connection point of the resistances R3 and R4 outputs a signal Vp2_dvdt that is a differentiated signal of the detected signal Vp2. Because of the equal resistances R3 and R4, the signal Vp2_dvdt varies around the potential VDD/2.

The differentiation detecting circuit DVD further comprises: two comparators Comp1 and Comp2; input terminals 53 and 54; one-shot circuits 55 and 56; and output terminals 57 and 58. The comparator Comp1 has an inverting input terminal connected to the input terminal 53 that receives a threshold value Ref_I and a non-inverting input terminal connected to the connection point of the capacitor C1, the resistor R3, and the resistor R4, the connection point being the output point of the differentiating circuit composed of the capacitor C1, the resistor R3, and the resistor R4. The output terminal of the comparator Comp1 is connected to the output terminal 57 through the one-shot circuit 55. The one-shot circuit 55 detects a front edge of rising up of the output signal from the comparator Comp1 showing that the output signal from the differentiating circuit has exceeded the threshold value Ref_I and outputs a signal P2_1 with a predetermined pulse width for example, 50 ns. The comparator Comp2 has a non-inverting input terminal connected to the input terminal 54 that receives a threshold value Ref_h and an inverting input terminal connected to the connection point of the capacitor C1, the resistor R3, and the resistor R4. The output terminal of the comparator Comp2 is connected to the output terminal 58 through the one-shot circuit 56. The one-shot circuit 56 detects a front edge of rising up of the output signal from the comparator Comp2 showing that the output signal from the differentiating circuit has decreased below the threshold value Ref_h and outputs a signal P2_H with a predetermined pulse width for example, 50 ns. The threshold value Ref_I is set at a value at the middle between the voltage VDD and the half of the VDD, and the threshold value Ref_h is set at a value at the middle between the half of the VDD and the ground potential.

The differentiation detecting circuit DVD receives the signal Vp2 generated by the auxiliary winding P2 of the transformer T1. The winding ratio of the primary winding P1 to the auxiliary winding P2 of the transformer T1 is about 100, for example. Therefore, the differentiation detecting circuit DVD receiving the signal Vp2 can be constructed of a low voltage circuit that does not require any high voltage circuit elements.

The dead time adjusting circuit DT has the input terminals 61 and 62 to receive the signals Ho and Lo, respectively, generated by the controller circuit CNT1, and the input terminals 63 and 64 that receive the signals P2_L and P2_H, respectively, detected by the differentiation detecting circuit DVD. The dead time adjusting circuit DT includes a circuit that holds the signals Ho and Lo, and combines the signals Ho and Lo and the signals P2_L and P2_H, and outputs a delayed common signal P2_HL. This circuit comprises reset-priority RS flip-flops 65 and 66, AND gates 67 and 68, an OR gate 69, and a delay circuit 70. The input terminal 61 is connected to the set input terminal of the RS flip-flop 65 and the reset input terminal of the RS flip-flop 66; the input terminal 62 is connected to the set input terminal of the RS flip-flop 66 and the reset input terminal of the RS flip-flop 65. The output terminal of the RS flip-flop 66 is connected to one terminal of the AND gate 67 and the other input terminal of the AND gate 67 is connected to the input terminal 63. The output terminal of the RS flip-flop 65 is connected to one terminal of the AND gate 68 and the other input terminal of the AND gate 68 is connected to the input terminal 64. The output terminals of the AND gates 67 and 68 are connected to the input terminals of the OR gate 69, and the output terminals of the OR gate 69 is connected to the input terminal of the delay circuit 70 that has a delay time Delay1. The delay time Delay1 is set at about 200 ns, for example.

The dead time adjusting circuit DT has an input terminal 71 that receives the Off_trig from the voltage controlling oscillator circuit (VCO) 2, an output terminal 72 that outputs the signal On_trig to the voltage controlling oscillator circuit (VCO) 2 and to the controller circuit CNT1, and a circuit for adjusting dead time. This circuit comprises a timer 73, an OR gate 74, reset-priority RS flip-flops 75 and 76 that are signal holding circuits, one-shot circuits 77 and 78, and a delay circuit 79. The input terminal 71 is connected to the set input terminal of the timer 73; the reset input terminal of the timer 73 is connected to the output terminal 72; and the output terminal of the timer 73 is connected to one input terminal of the OR gate 74. The timer 73, on receiving a set input signal, starts counting for about 20 µs. If no reset input is given during the counting period, the timer 73 delivers a high level output signal after the maximum dead time, which is set to be about 20 µs in this example, has expired. The other input terminal of the OR gate 74 is connected to the output terminal of the delay circuit 70, and the output terminal of the OR gate 74 is connected to the set input terminal of the RS flip-flop 75. The reset input terminal of the RS flip-flop 75 is connected to the output terminal 72, and the output terminal of the RS flip-flop 75 is connected to the set input terminal of the RS flip-flop 76. The input terminal 71 is also connected to the input terminal of the one-shot circuit 77 that is a minimum dead time setting circuit, and the output terminal of the one-shot circuit 77 is connected to the reset terminal of the RS flip-flop 76. This one-shot circuit 77 sets a minimum dead time signal Tdead, for example about 300 ns, which must be waited before delivering a signal On_trig after receiving a signal Off trig. The output terminal of the RS flip-flop 76 is connected to the input terminal of the one-shot circuit 78 that is a signal conversion circuit, and the output terminal of the one-shot circuit 78 is connected to the input terminal of the delay circuit 79 having a delay time Delay2. The delay time Delay2 is set to be about 50 ns, in this example.

The following describes operation of the switching regulator constructed as described above when the oscillation frequency of the voltage controlling oscillator circuit (VCO) is a very high value near the maximum value fmax, which is the case in the light load period, at the start up time, and immediately after change of a target voltage. Since the switching frequency is much higher than the resonance frequency of the resonance oscillating circuit, the variation of the voltage across the capacitor Cr is negligibly small in one switching period. Consequently, the variation of the voltage Vs can be detected directly by the signal Vp2 from the auxiliary winding P2. The normal mode here means a stable resonant oscillation state, in which the voltage across the resonant oscillation capacitor Cr averaged over one period is equal to the half of the voltage Vi of the DC power supply Ed. The short-circuit current mode means a state out of the stable resonant oscillation state and hard switching or short-circuit current possibly occurs.

The signal Vp2 is generated by switching of the switches Qa and Qb. The signal Vp2 has a magnitude approximately proportional to the voltage Vs between the switch Qa and the switch Qb. The direction of current changes with the resonant oscillation in the dead time, and the signal Vp2 changes remarkably during transfer of the resonant oscillation current between the body diode Da and the body diode Db. Of the changes in the signal Vp2, the differentiation detecting circuit DVD first detects the change during rise up of the signal Vp2, and then detects the change during fall down. The differentiation detecting circuit DVD generates the signal Vp2_dvdt by differentiating the signal Vp2 through the differentiating circuit in the differentiation detecting circuit DVD. Then, the comparator Comp1 compares the signal Vp2_dvdt with the threshold value Ref_I. When the signal Vp2_dvdt exceeds the threshold value Ref_I, the comparator Comp1 outputs a high level signal. The one-shot circuit 55 detects the timing of the front edge of rise up of the signal Vp2_dvdt from the front edge of rise up of the output of the comparator Comp1, and delivers the signal P2_I with a predetermined pulse width. After that, the comparator Comp2 compares the signal Vp2_dvdt with the threshold value Ref_h. When the signal Vp2_dvdt decreases below the threshold value Ref_h, the comparator Comp2 outputs a high level signal. The one-shot circuit 56 detects the timing of the front edge of fall down of the signal Vp_dvdt from the front edge of rise up of the output of the comparator Comp2, and delivers the signal P2_H with a predetermined pulse width. Thus, the differentiation detecting circuit DVD detects the timing of the front edge of the signal Vp2_dvdt, which is the timing of start of reversal of the signal Vp2.

A situation is assumed in which the signal Lo that drives the low side switch Qb turns OFF from an ON state upon receiving the signal OFF_trig that triggers turning OFF of the switch Qa or the switch Qb. Here, the wording 'turn OFF of the signal Lo' means that the signal Lo changes from a state for turning ON the switch Qb to a state for turning OFF the switch Qb. At this time in the dead time adjusting circuit DT, the state of the RS flip-flop 66 remains unchanged in the state that has been set during the ON state of the signal Lo. Consequently, the signal P2_L received at the input terminal 63 is transferred through the AND gate 67 and the OR gate 69 to the delay circuit 70 which in turn outputs a signal P2_hl delayed by a delay time Delay1. This signal P2_HL is transferred through the OR gate 74 and the RS flip-flops 75 and 76, and enters the one-shot circuit 78 that converts the signal P2_HL to a signal with a predetermined pulse width. This pulse signal enters the delay circuit 79 where the signal is delayed by a delay time Delay2. Then, a signal On_trig is delivered to trigger turning ON of the switch Qa or switch Qb. When this signal On_trig is given to the controller circuit CNT1, a signal Ho is delivered at that timing to turn ON the high side switch Qa, and at the same time, the RS flip-flop 66 is reset.

In the similar way, when the ON and OFF states of the switch Qa and the switch Qb are exchanged and a signal Off trig is delivered to turn OFF the high side switch Qa, the signal Vp2 falls down corresponding to the voltage Vs between the switch Qa and the switch Qb in a dead time. This fall down of the signal Vp2 is detected by the comparator Comp2 in the differentiation detecting circuit DVD and a signal P2_H is delivered. The signal P2_H enters the dead time adjusting circuit DT, and is delayed in the delay circuit 70 to give a signal P2_hl, which is further delayed in the delay circuit 79 to give a signal On_trpre This signal On_trpre turns ON the low side switch Qb.

Thus, the signal On_trpre is delivered only after a predetermined time has passed from the output of the signal Off_trig from the voltage controlling oscillation circuit VCO and detection of start of change in the signal Vp2. In the normal mode, the timing of the signal Off_trig and the timing of change of the signal Vp2 are approximately simultaneous. Consequently, the signal On_trig is delivered after a dead time Td that is the sum of the delay time Delay1 and the delay time Delay2.

In the embodiment described thus far, capacitors are used in the circuit for generating a dead time and a circuit for generating an ON pulse width. However, other circuit component for example, digital counter, can be used as well, as long as it performs an integrating function. In the embodiment described thus far, a resonance inductance in the main circuit is the leakage inductance of the transformer. However, a resonance reactor can be connected in series to the primary winding of the transformer to perform the same operational control.

Embodiments of the invention prevent frequency variation in the circuit for avoiding through-current and hard switching in a resonance type switching power supply using series-connected semiconductor switches. Embodiments can be applied to various types of switching power supplies and inverters for induction heating apparatuses, for example.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description: specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

What is claimed is:

1. A switching power supply comprising:
   a transformer having a primary winding, a secondary winding, and an auxiliary winding, the auxiliary winding being disposed in a primary side of the transformer and detecting variation in a voltage across the primary winding;
   a series-connected circuit including a first semiconductor switch and a second semiconductor switch, the series-connected circuit being connected in parallel to a DC power source;
   a series-connected resonance circuit including series-connected components of a resonance capacitor, an inductance element of a leakage inductance of the transformer, and the primary winding of the transformer;
   a differentiating circuit for detecting a timing of an inversion beginning timing or an inversion ending timing of the voltage detected by the auxiliary winding after receiving a first trigger signal for turning OFF of the first semiconductor switch or the second semiconductor switch;
   a dead time adjusting circuit for generating a second trigger signal at a timing of turn ON the first semiconductor switch or the second semiconductor switch delaying a predetermined time period from the timing detected by the differentiating circuit of the inversion beginning timing or the inversion ending timing of the voltage detected by the auxiliary winding; and
   a voltage control oscillator including an ON width determining means that comprises a minimum dead time-generating circuit for generating a minimum dead time on receiving the first trigger signal and starts up operation to determine an ON width of the first semiconductor switch or the second semiconductor switch after the minimum dead time.

2. The switching power supply according to claim 1, wherein,
   the ON width determining means comprises: the minimum dead time-generating circuit for generating the minimum dead time on receiving the first trigger signal,
   an integration circuit to start integrating operation according to an output signal of the minimum dead time generating circuit, and
   a voltage comparing circuit for comparing an output of the integrating circuit with an output of an error amplifier that senses a DC output voltage and eliminates the deviation from a reference value, and wherein,
   the ON width is determined to be a time duration from the end of the minimum dead time to the next first trigger signal in the case the second trigger signal is generated within the minimum dead time, and the ON width is determined to be a time duration from the moment the second trigger signal is generated to the next first trigger signal in the case the second trigger signal is generated after the end of the minimum dead time.

* * * * *